United States Patent
Riant et al.

(10) Patent No.: US 6,321,008 B1
(45) Date of Patent: Nov. 20, 2001

(54) FILTER OPTICAL WAVEGUIDE WITH INCLINATION AND LINEAR CHIRP

(75) Inventors: Isabelle Riant; Pierre Sansonetti, both of Palaiseau (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/489,845

(22) Filed: Jan. 24, 2000

(30) Foreign Application Priority Data

Jan. 25, 1999 (FR) .................................................. 99 00758

(51) Int. Cl.$^7$ ....................................................... G02B 6/34
(52) U.S. Cl. ............................................. 385/37; 385/123
(58) Field of Search .............................. 385/37, 123, 126, 385/127, 130; 430/290

(56) References Cited

U.S. PATENT DOCUMENTS

| | | | |
|---|---|---|---|
| 4,474,427 | 10/1984 | Hill et al. | 385/123 |
| 4,974,930 | 12/1990 | Blyler, Jr. et al. | 385/28 |
| 5,832,156 | * 11/1998 | Strasser et al. | 385/48 |
| 5,883,990 | 3/1999 | Sasaoka et al. | 385/37 |
| 6,005,999 | * 12/1999 | Singh et al. | 385/37 |
| 6,038,359 | 3/2000 | Moslehi et al. | 385/42 |
| 6,058,231 | 5/2000 | Haggans et al. | 385/37 |
| 6,069,988 | 5/2000 | Kokura et al. | 385/37 |
| 6,104,852 | * 8/2000 | Kashyap | 385/123 |
| 6,111,999 | 8/2000 | Espindola et al. | 385/37 |
| 6,157,758 | * 12/2000 | Abe et al. | 385/37 |

FOREIGN PATENT DOCUMENTS

| | | |
|---|---|---|
| 0 310 438 A1 | 4/1989 | (EP) . |
| 0 435 201 A2 | 3/1991 | (EP) . |
| 0 840 150 A2 | 5/1998 | (EP) . |
| WO 94/00784 | 1/1994 | (WO) . |
| WO 97/08574 | 3/1997 | (WO) . |
| WO 97/26571 | 7/1997 | (WO) . |

OTHER PUBLICATIONS

Delevague E. et al: "Optical Fiber Design for Strong Gratings Photoimprinting with Radiation Mode Suppression" Optical Fiber Communication, US, New York, IEEE, p. 343–346 XP000575468 ISBN: 0/7803-2654-7 (1995).

Patent Abstracts of Japan, vol. 012, No. 390 (P–722) Oct. 18, 1988 corresponding to JP 63–132205 A (Ricoh Co Ltd) dated Jun. 4, 1988.

* cited by examiner

Primary Examiner—John D. Lee
Assistant Examiner—Sarah N Song
(74) Attorney, Agent, or Firm—Sughrue, Mion, Zinn, Macpeak & Seas, PLLC

(57) ABSTRACT

An angled Bragg grating optical waveguide section adjusts the spectral response of a transmission filter in an optical waveguide or in an optical fiber. To smooth the response of the filter, which is subject to modulation due to coupling to the various cladding modes, the pitch of the Bragg grating is caused to vary in a linear fashion along the length of the filter. To adapt the attenuation band to a required band, the cladding of the optical fiber is doped with a photosensitive material so that the grating is also formed in the cladding. The photosensitivity of the cladding is advantageously greater than that of the core, in a ratio in the order of 5:1.

13 Claims, 4 Drawing Sheets

FILTER OPTICAL WAVEGUIDE WITH INCLINATION AND LINEAR CHIRP

BACKGROUND OF THE INVENTION

1. Field of the Invention

The present invention relates to a frequency domain filter for modifying the transmission spectrum of an optical waveguide. The frequency domain filter of the invention is formed in a portion of optical waveguide which is modified to confer a filtering capability on it. The present invention applies to planar optical waveguides and to optical fibers. The principles of the invention are illustrated using the example of optical fibers, but the skilled person will know how to transpose this teaching to apply it as it stands to optical waveguides.

2. Description of the Prior Art

Filter optical waveguides include Bragg gratings in planar waveguides and in core sections of optical fibers. The Bragg gratings are formed by periodically modifying the refractive index of the material of the waveguide or the fiber by ultraviolet irradiation of the waveguide or the core of the fiber. The modification of the refractive index caused by exposure to light is referred to as the "refractive photo effect." This effect is permanent. The property of a material having an index that can be modified by irradiating it with light is referred to herein as its photosensitivity. The photosensitivity characteristics are related in the current state of the art to the presence of a germanium defect in the silica matrix of the waveguide or optical fiber. Other dopants can be used to render the waveguide or the core of the fiber photosensitive.

An advantage of germanium is that it is normally present in the core of optical fibers because it increases the refractive index of the core of the fiber relative to that of the optical cladding surrounding the core. This increase in the index, also referred to as the index step, guides the light signal in the core of the fiber. The same effect is used for waveguides.

Various layers of doped or undoped silica are successively deposited on the inside of a glass tube during the fabrication of an optical fiber preform and progressively adhere to the inside wall of the tube to constitute the various layers of the optical fiber. The diameter of a preform obtained in this way is greater than the diameter of the fiber, which is obtained by heating and drawing the preform.

A section of the waveguide or the core of the fiber which is to serve as a filter is then selectively and periodically exposed to ultraviolet radiation to form the Bragg grating. This irradiation brings about permanent local modifications of the refractive index. These modifications are related to a chemical and structural modification of the bonds of the germanium (or other dopant) atoms in the waveguide or the core. The variation in the value of the refractive index of the waveguide or the core of the fiber resulting from these modifications can be a few parts per thousand.

The grating then consists of a modulation of the refractive index along the section forming an attenuator filter.

Conventionally, when the refractive index modifications are perpendicular to the axis of the waveguide or the optical fiber, the quantity of light not transmitted by the filter is reflected into the waveguide or into the core of the optical fiber, with maximum reflection at the Bragg wavelength, which is determined by a resonance condition. In physical terms, the fundamental mode propagating codirectionally is coupled to the mode propagating contradirectionally.

Depending on the length of the section exposed, the period at which the modifications are reproduced along that section and the magnitude of the modification (the greater or lesser variation of the refractive index at the location of the modifications), the following transmission characteristics can be respectively modified: the width, the center frequency of the filter, and the degree of attenuation obtained (contrast).

If large variations of the index are photo-induced in the core of a fiber, the fundamental mode is also coupled to cladding modes, at shorter wavelengths. According to the paper D1="Optical fiber design for strong gratings photimprinting with radiation mode suppression" by E. DELEVAQUE et al, given to the OFC San Diego 1995, Post Deadline 5, conference, this can be avoided by doping part of the cladding close to the core with germanium. A fluorine codopant is added to the cladding to re-establish the index step.

In one particular application, attempts have been made to use such filters to compensate defects in the flatness of the gain of amplifiers used along very long haul optical links. Over very long distances, and in particular on submarine links, the attenuation per kilometer of the light waves in the optical fibers is such that optical amplifiers are required from place to place. Such amplifiers are known to have the unfortunate drawback of systematically favoring some of the frequency components in the band transmitted.

This phenomenon is accentuated by the fact that these optical amplifiers are used in wavelength division multiplexed (WDM) links in which various channels are transported by optical carriers at different frequencies in order to increase the global capacity and modularity of the system. Because of the phenomenon employed in the optical amplifier, the spectral response would be unacceptable if it were not regularly compensated. In the present application, what is most important is to flatten the gain of the erbium-doped fiber optical amplifiers. Other applications are naturally feasible.

This type of Bragg grating filter therefore has the disadvantage of acting as a partial reflector of the components of the amplified signal to which the filtering applies. Part of the optical signal at these frequencies is therefore reflected back into the optical amiplifier. As a result, the signal reflected by the filter causes interference in the amplifier section, but the signal back-scattered by the filter is also sent back in the line and degrades transmission characteristics.

The article D2 ="Wideband gain flattened erbium fiber amplifier using a photosensitive fiber blazed grating" by R. Kashyap, R. Wyatt and R. J. Campbell published in Electronics Letters, Jan. 21, 1993, vol. 29, No. 2, pages 154 through 156, in particular envisages the principle of inclining the fringes representative of the modulated index areas in order to prevent such reflection. This can be achieved by causing two beams from an argon laser doubled in frequency at 244 nm to interfere and by inclining the normal to the section serving as a filter relative to the exposure bisector of the two beams. A phase mask can also be used, principally generating two orders of diffraction (+1 and −1) and a very small zero order. The inclination is 8° in the above article, for example. The advantage of the inclination is that it eliminates reflection. This is because the effect of the inclination is to couple the fundamental mode propagating codirectionally with contradirectional cladding modes. These cladding modes are very quickly absorbed by the cladding. The spectral envelope of the set of frequency components in these various cladding modes can then be used as characteristic of a fiber used to compensate the gain of the optical amplifiers.

The disadvantage of this technique lies in the selectivity of the filter. This is because, using standard telecommunication fibers, it is not possible to obtain a filter band less than 20 nm, for example, using a Bragg grating filter of this kind with inclination of the index modifications. It is possible in theory to alter the diameter of the core to reduce the bandwidth of the filter. The filter is therefore more selective if the core diameter is greater, for example 9 µm instead of 3 µm. However, this increase in diameter is limited. Furthermore it has a number of drawbacks, including that of requiring adaptation sections between a fiber with a large diameter core and a fiber with a standard diameter core (in the order of 9 µm). These adaptations are difficult to make.

The attenuation by the cladding modes is improved, which is in accordance with the stated objective, but the length of the grating can no longer reduce the bandwidth of the filter. In practice reducing the angle makes the filter more selective but at the same time increases residual emission by reflection, of the upright fringe type. In contrast, increasing the inclination of the angle reduces the effect of the reflection phenomenon but increases the bandwidth of the filter, i.e. reduces the selectivity of the filter. The compromise arrived at is not satisfactory in all cases and there is room for improvement.

A second problem with this type of filter is connected with filter rebound in a low-frequency band, i.e. a band at a greater wavelength, close to the wanted band in which the filtering is applied. This rebound is due to the residual reflection referred to above in the fundamental mode. Initially this rebound is not a problem because prior art optical amplifiers have a limited bandwidth, outside which the filter rebound occurs. It must nevertheless remain low. However, in other applications, and in particular in terrestrial applications, the filter is used selectively to attenuate different components in the wanted band. The rebound will therefore also be in the wanted band. Filter rebound is therefore a problem in these other applications.

Thirdly, it has already been pointed out that the attenuation is in fact merely the envelope of the attenuations of different spectral components. This means that, within the envelope, some spectral components are effectively filtered while others are filtered to a lesser degree, or even not at all. This is due to the discrete nature of the cladding modes. Under these conditions, the filter envelope corresponds to a set of relatively narrow bandwidth discrete filters separated from each other by frequency gaps in which there is no filtering. Thus a filter of this kind cannot be used to equalize correctly the gain of the optical amplifiers.

The drawback of the compromise referred to above in connection with the teaching of document D2 is addressed in document D3="Ultra Narrow Band Optical Fiber Sidetap Filters" by M. J. Holmes, R. Kashyap, R. Wyatt and R. P. Smith, Proc. ECOC 1998, pp. 137–138, Madrid. Sep. 20–24, 1998. Document D3 teaches increasing the selectivity of a Bragg grating filter by forming a slightly inclined grating in the cladding of the fiber (and not in the core). Because of the absence of fringes in the core, retroreflection losses in the fundamental mode are considerably reduced, even at very small angles of inclination (3° rather than the 8° of document D2).

In French patent application 98 06904 (A1), the first problem is solved by causing the cladding to participate in the phenomenon of interference employed in the filtering process. According to the teaching of application A1, the Bragg grating is formed in the core and in the cladding. It is therefore formed over a greater diameter than the core of the fiber and the filter is therefore rendered more selective. The spectrum of the filter is then easily controlled by altering the diameter of the part of the cladding that contributes to the radiative coupling.

The present invention addresses the third problem referred to above with reference to document D2, namely the modulation of the response of the filter as a consequence of the discrete nature of the cladding modes. To increase the filter power (contrast) of a Bragg filter, either the amplitude of the photo-induced refractive index variations can be increased or the length of the filter can be increased. The present invention addresses the problem of increasing the length of the filter, which has the unwanted effect of narrower coupling to each of the cladding modes and therefore greater modulation of the filter response.

SUMMARY OF THE INVENTION

The invention therefore provides a Bragg grating filter optical waveguide including a guiding first region doped with a material whose refractive index can be modified and a second region around the guiding first region, wherein the Bragg grating is formed in the optical waveguide as a quasi-periodic succession of variations of the optical refractive index along the length of the guide; the grating is inclined relative to a plane perpendicular to the axis of propagation of light in the waveguide; the Bragg grating further includes a variation of the period along the length of said waveguide; the variation of the period is a monotonous variation along the length of the fiber. In other words, the invention concerns an inclined Bragg grating filter having a linear "chirp" ("chirp" is the term usually employed by the skilled person to refer to the variation in the pitch of the Bragg grating).

Another preferred embodiment of the invention concerns a Bragg grating filter optical waveguide including a guiding first region doped with a material whose refractive index can be modified and a second region around the guiding first region; the Bragg grating is formed in the guiding first region as a quasi-periodic succession of variations of the optical refractive index along the length of the fiber; the Bragg grating further includes a variation of the period along the length of the fibre; the variation of the period is a monotonous variation along the length of the fiber; the grating is inclined relative to a plane perpendicular to the axis of propagation of light in the waveguide. In other words, the invention concerns a Bragg grating filter with linear chirp in which the grating is inclined.

In various embodiments, the grating has a length between a few millimeters and a few centimeters.

In accordance with other features of the invention, some or all of said second region (cladding) is doped with a material whose refractive index can be modified and this material of the second (cladding) region is also modified to form a quasi-periodic longitudinal grating made up of inclined index modifications with a period ΔL, monotonous along the length (z) of said fiber and with the same variation ("chirp") δL(z) of said period ΔL.

The invention can advantageously include the features of application A1 or French patent application 98 06905 (A2— U.S. equivalent Ser. No. 09/323,136).

The invention will be better understood after reading the following description and studying the accompanying drawings. The drawings are given by way of nonlimiting example of the invention.

DETAILED DESCRIPTION OF THE PREFERRED EMBODIMENTS

In all the figures, the same reference symbols designate the same components. For reasons of clarity not all the figures are to the same scale.

Figure 1:
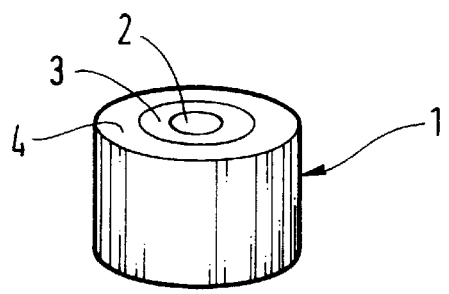
FIG. 1 shows an optical fiber preform which can be used to make the filter optical fiber of the invention.

FIG. 1 shows an optical fiber preform 1. The preform 1 includes a first cylinder 2 surrounded by an inner cylindrical ring 3 and an outer cylindrical ring 4. The cylinder and the rings represent the various layers of materials present in the optical fiber when it has been drawn. The radial dimensions of the cylinders and cylindrical rings 2 to 4 are geometrically similar to the much smaller dimensions of the corresponding parts of the optical fiber when it has been drawn. In practice, a fiber core and cladding respectively corresponding to layers 2 and 3 are each made up of several layers. The layers 2 to 3 are therefore doped with various dopants as the preform is made.

Figure 2:
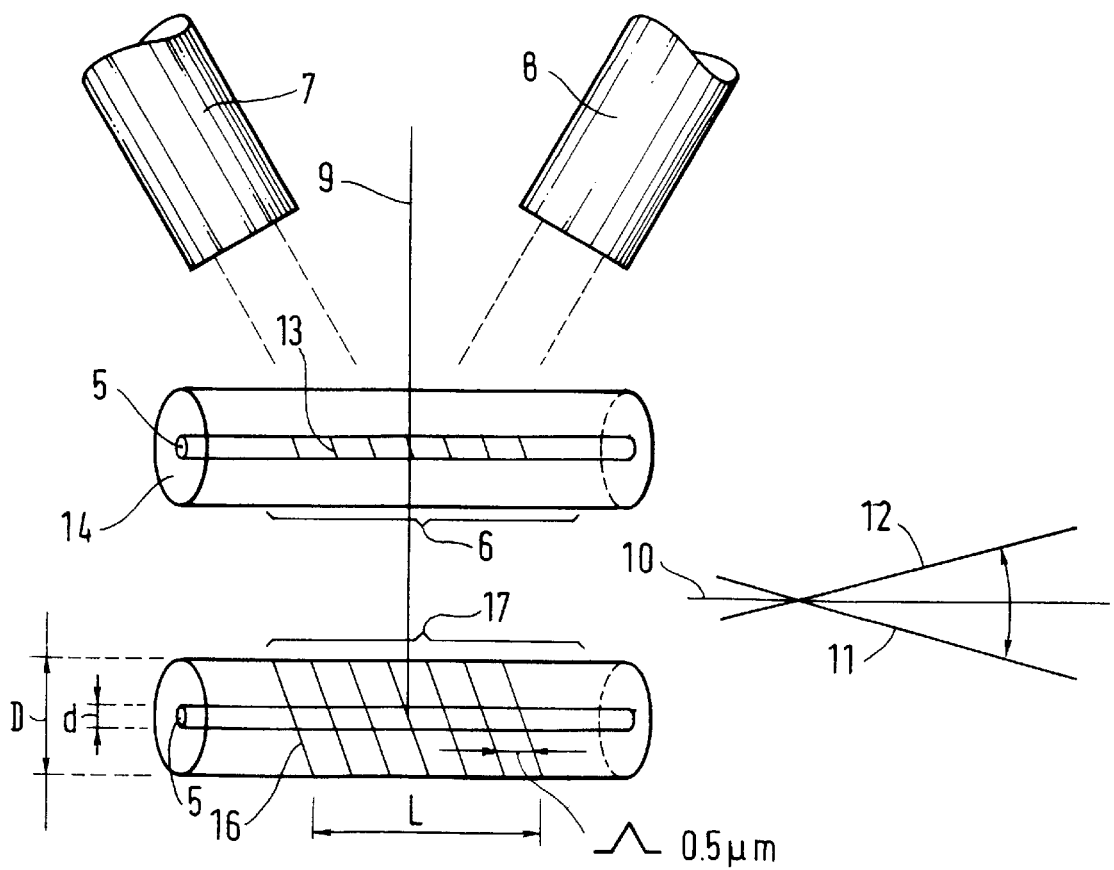
FIG. 2 shows a process that can be used to prepare the optical fiber of the invention for its filter function.

FIG. 2 shows a preferred method of exposing a photosensitive material which can be used to create a grating made up of index modifications within the core 5 of a fiber. A similar method can be used to photo-inscribe a Bragg grating inside a photosensitive optical waveguide. In a prior art fiber, the core 5 is doped with germanium when the cylinder 2 is fabricated. The germanium-doped core is exposed over a length corresponding to a filter section 6 to two inclined beams 7 and 8 from a coherent laser. The bisector 9 of the angle between the beams is substantially perpendicular to the axis 10 of the core 5. As indicated in document D2 cited above, the laser beams 7 and 8 can be from a frequency doubled argon laser at a wavelength of 244 nm. According to the teaching of document D2, by inclining the axis 10 toward directions 11 or 12 relative to the normal to the bisector 9 it is possible to obtain inclined interference fringes and therefore an inclined grating made up of index modifications. FIG. 2 shows in highly schematic section slices 13 of inclined discs. In practice the degree of modification evolves progressively between a minimum and a maximum between each fringe and the next. There are not really any discs, but this form of representation is convenient.

As an alternative to the above, the inclined grating can also be made using a phase mask device.

Fabricating cores 5 with a diameter of 9 μm is known in the art. The standard SMF-28 fiber from Corning Incorporated, New York, USA, is a monomode fiber with this diameter. The cylinders 3 and 4 form a cladding-tube system of these fibers. In one example, and in particular in that indicated hereinabove, the outside diameter D of the system is in the order of 125 μm to 130 μm.

In a variant, and as explained in applications A1 and A2, rather than merely doping the material 2 from which the core 5 is made with germanium, all or part of the material 3 of the cladding is also doped. Accordingly, on exposure, fringes 16 are developed not only in the core 5 but also in the cladding 3. Once again, the bottom part of FIG. 2 is highly schematic and these fringes are not discs.

The section 17 in which the index modifications occur depends on the exposure limits. It has a length L. The differences between the maxima of the various modifications occupy a space ΔL (in the order of 0.5 μm) corresponding to the distance between fringes. These periods produce filters at infra-red wavelengths (around 1.5 μm). The magnitude of the modification is related to the power of the two laser beams 7 and 8, the exposure time and the germanium concentration, The above parameters are beneficial for adjusting the filter constituted by the section 17.

Figure 3:
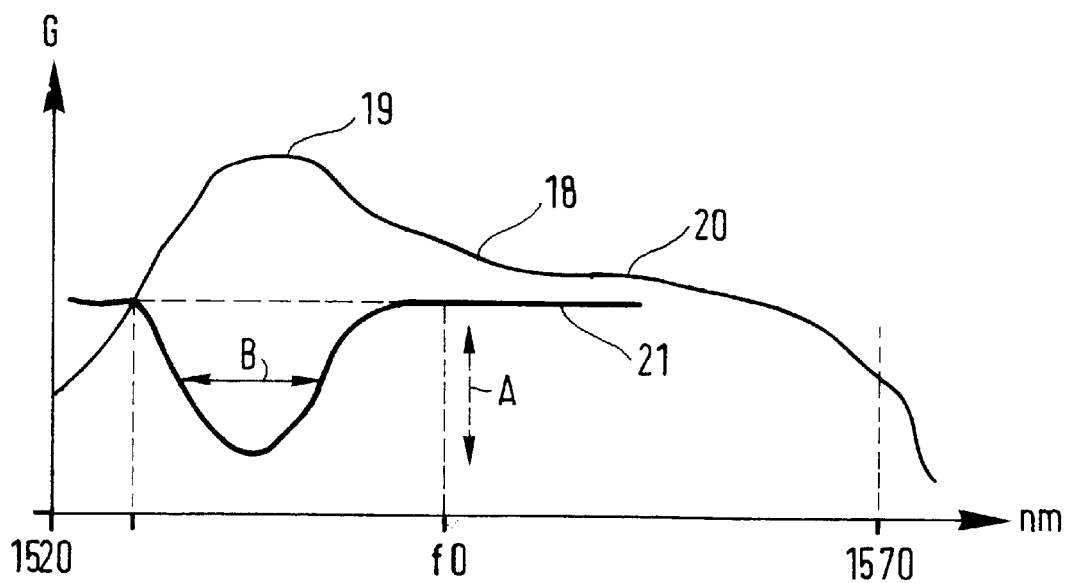
FIG. 3 is a frequency diagram showing, in one application, amplification defects of erbium-doped fiber optical amplifiers and the correction applied by the filter of the invention.

FIG. 3 shows a curve 18 which is a symbolic and somewhat exaggerated representation of the unwanted effects of erbium-doped optical fiber based optical amplifiers (EDFA—Erbium-Doped Fiber Amplifiers). These amplifiers are useful because they have a wide bandwidth centered on the wavelengths used in optical transmission. However, they have the drawback of imposing overamplification 19 at some places in the spectrum relative to the amplification 20 at other places in the spectrum. It is this overamplification 19 that has to be combated with a filter inserted into the propagation path of the waves from these amplifiers.

Curve 21 is a schematic representation of the filter obtained by incorporating a filter section 17 as shown in the lower part of FIG. 2. The characteristics of the filter are its Bragg wavelength f0 (slightly greater than the center wavelength of the filter), the amplitude A of the selective attenuation that it imposes and its bandwidth B. It is known that f0 depends on ΔL, A depends on the degree of modification of the photosensitive materials inserted into the fiber and, for standard Bragg grating with upright modifications, B depends on the length of L of the section 17. Increasing the length L decreases the bandwith B.

In the prior art with inclined modifications, where only the core 5 of the fiber is doped with germanium, the bandwidth B is much greater than the bandwidth of the overamplification 19. Consequently, the fiber is mismatched in frequency terms For the reasons already stated, with inclined modifications there would be no utility in increasing the length L.

Figure 4:
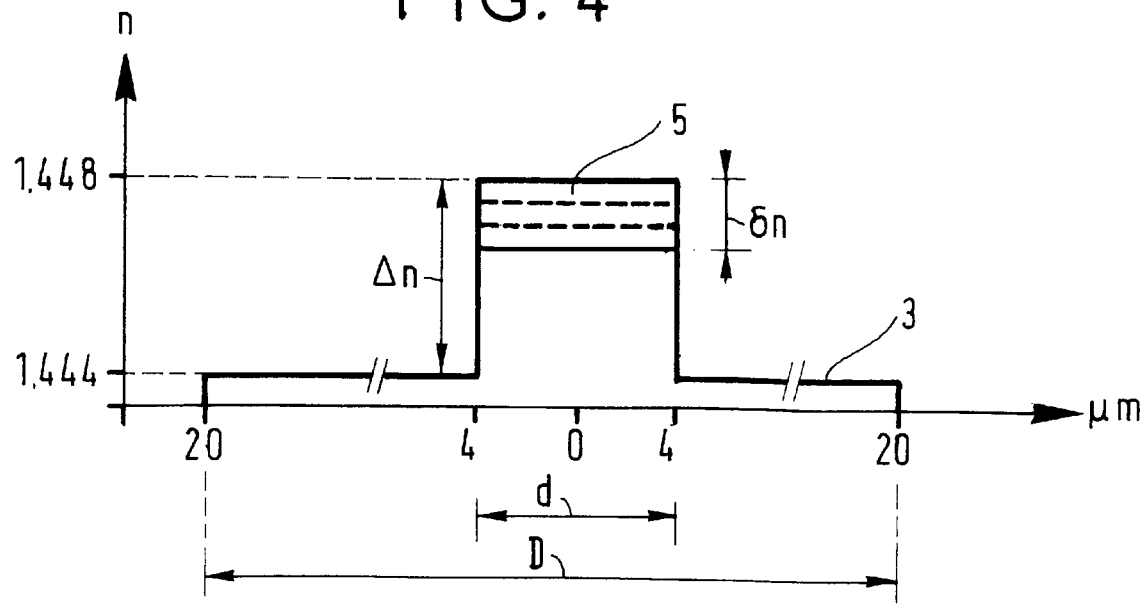
FIG. 4 shows one example of a refractive index profile of the core and the cladding of the filter optical fiber of the invention.

FIG. 4 shows the index profile obtained in an optical waveguide (here a fiber) in accordance with the invention. Relative to a central abscissa 0 in the middle of the core 5 of the fiber, there can be seen, on either side, the abscissae of the ends of the diameter of the core 5, at a distance of about 4 μm, and the abscissae of the ends of the diameter of the cladding 3, at a distance of approximately 20 μm. The refractive index profile features a step $\Delta n = n_c - n_g$ in the order of 0.5%. This index profile is needed to propagate a single fundamental optical mode in the core of the fiber. This index profile is obtained by doping the core of the fiber with materials having the property of increasing the refractive index. Generally the doping is effected with germanium. Phosphorus can also be used to increase the index.

Germanium has a usable photosensitivity because of the modifications of the chemical bonds and the structure by exposure to constitute the grating made up of index modifications. Accordingly, the refractive index varies progressively along the section 17 with a variation δn and periodically from one fringe to the other. The variation δn is a fraction of Δn.

Figure 5:
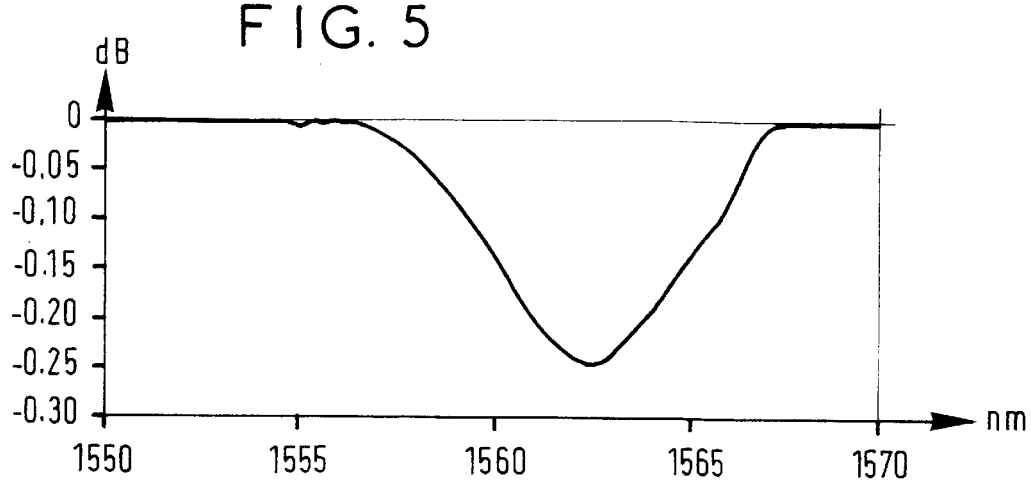
FIG. 5 shows one example of a transmission curve of a filter with a short (0.7 mm long) inclined Bragg grating, which is therefore of low contrast (−0.25 dB), implemented in accordance with application A1 or A2 or French patent application 98 06906 (A3—U.S. equivalent Ser. No. 09/316, 396).

FIG. 5 is a diagram showing the response of a filter in accordance with applications A1 to A3, with δn equal to $1.65 \times 10^{-3}$, the filter length L=0.7 mm, a grating inclined at a few degrees and a uniform (nonchirped) pitch. Note the smooth shape, relatively well matched to that of the amplification 19, as shown in FIG. 3, but also the very low contrast (or filtering power), which is only in the order of 0.25 dB.

Figure 6:
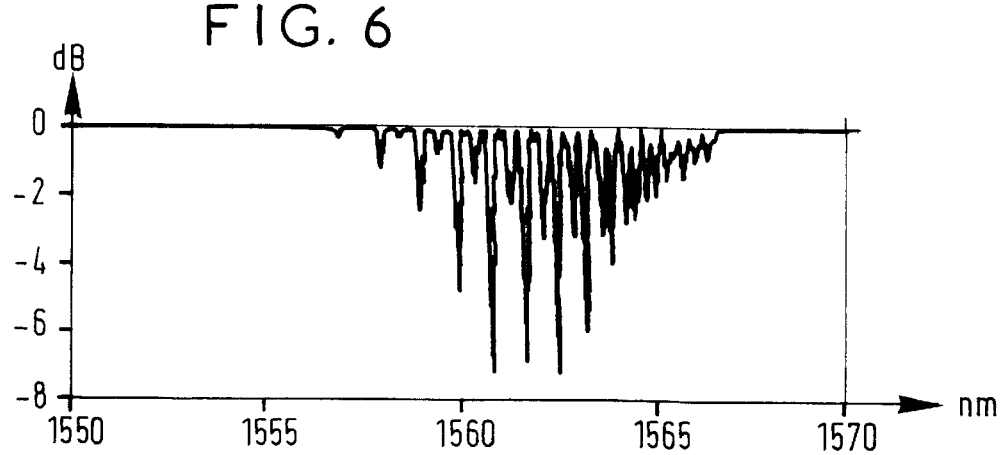
FIG. 6 shows one example of the transmission curve of an inclined Bragg grating filter which is made longer (5 mm) for improved contrast.

FIG. 6 is a diagram showing the response of a filter having the same fabrication parameters except that it is lengthened to a length L of 5 mm in an attempt to improve the contrast of the filter. The modulation due to the discrete nature of the response can be seen and is due to a reduction in the spectral width of the coupling to each cladding mode with the length of the filter. This filter cannot be used for the intended applications.

Figure 7:
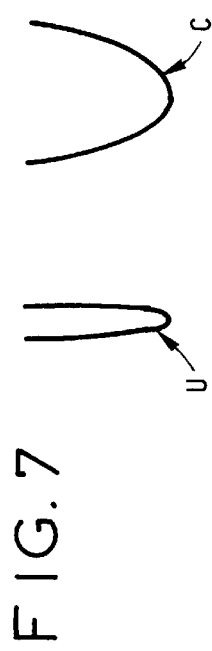
FIG. 7 compares the coupling to a cladding mode as a function of the propagated wavelength of inclined gratings without chirp and with chirp, diagrammatically and to an arbitrary scale.

FIG. 7 is a diagram showing the spectral shape of the coupling to a single cladding mode, on the left for an inclined grating with a length of a few millimeters but of constant pitch and on the right for a grating in accordance with the invention with the same inclination and the same length but with a variation of the pitch (chirp) along the length (z) of the filter. The widening of the spectrum of coupling to each cladding mode smoothes the response curve of FIG. 6.

Figure 8:
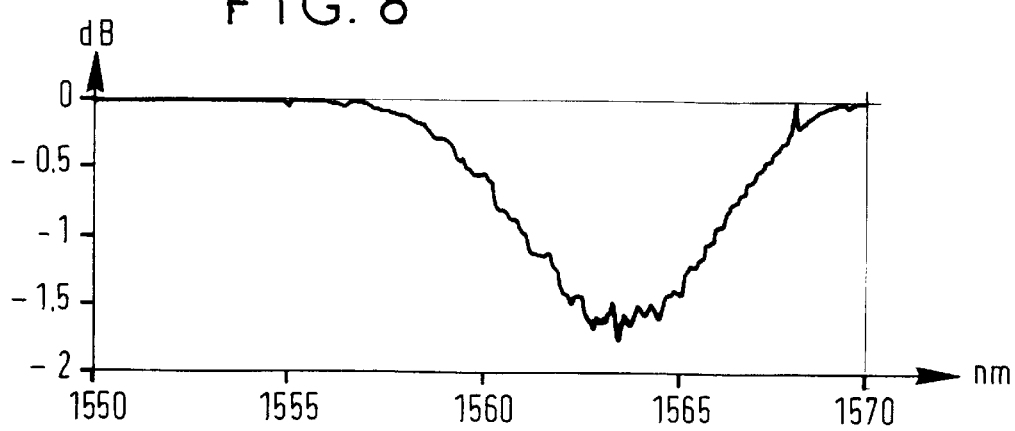
FIG. 8 shows one example of a transmission curve of a chirped medium-length (5 mm) inclined Bragg grating filter of the invention of greater contrast (−1.5 dB).

FIG. 8 is a diagram showing one example of the response curve of one example of a filter in accordance with the invention. The fabrication parameters of the filter are identical to those of the filter from FIG. 6, except that here the pitch of the grating varies along the length (z) of the filter (it is chirped). It can be seen that the modulation due to the coupling to the cladding modes visible in FIG. 6 is eliminated, although the two filters are the same length. In contrast, there is a clear improvement in the contrast (filtering power) of the filter in accordance with the invention relative to the short filter from FIG. 5, because the greatest attenuation is at least −1.5 dB, as compared to −0.25 dB for the short filter.

Figure 9:
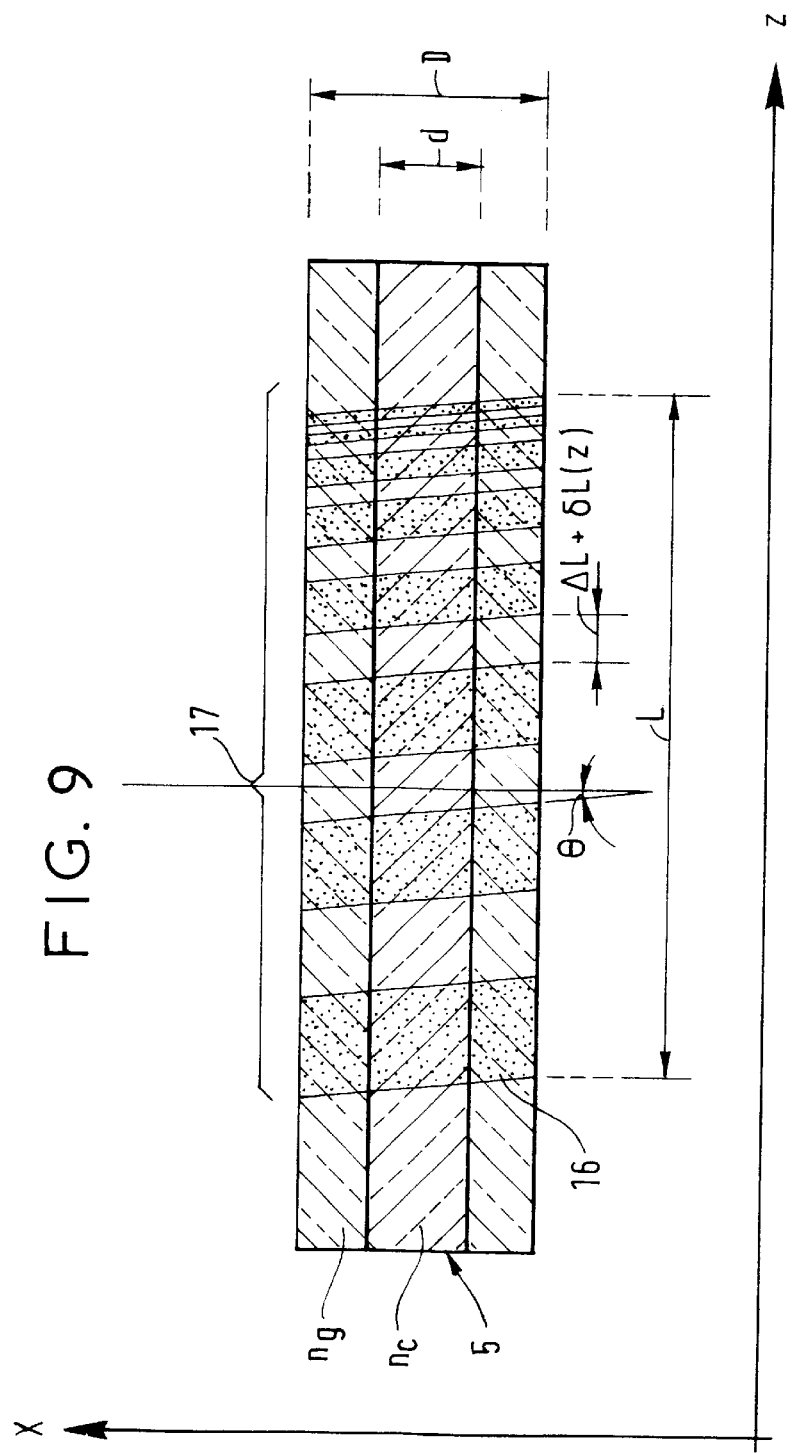
FIG. 9 is a diagram which shows one example of an optical filter in accordance with the invention with a chirped inclined Bragg grating.

FIG. 9 is a diagram showing the geometry of a chirped and inclined grating filter in accordance with the invention. The reference symbols used are the same as in FIG. 2. By way of example, the various parameters could have the following values:

Core refractive index $n_c = 1.444$

Cladding refractive index $n_g = 1.449$

Index step $\Delta n = n_c - n_g = 5 \times 10^{-3}$

Core diameter d=8 μm

Cladding diameter D=125 μm

Photo-inscribed filter length L=5 mm

Filter inclination Θ=4°

Bragg grating nominal pitch ΔL=540 nm

Corresponding Bragg wavelength ΔB=1562 nm

Linear chirp value δL(z)=0.2 nm/mm

As previously explained, choosing the values of these various parameters enables the filter designer to tune the center wavelength and the spectral response of the filter to an erbium-doped fiber optical amplifier, for example. However, consideration may be given to adapting a filter in accordance with the invention to any other light source or any other spectral problem to be solved. The length of the filter can be adjusted to obtain the required contrast and the angle of inclination must be adjusted to adjust the spectral width of the filter. As in applications A1, A2 and A3. various core/cladding index profiles and various core/cladding photosensitive dopings can be used to encourage or to eliminate some of the coupling to the cladding modes.

The invention has been illustrated using the nonlimiling example of an optical fiber as an optical waveguide. The skilled person will know how to generalize this example to apply it to any kind of optical waveguide, particularly planar waveguides formed on a substrate, for example a silica substrate.

There is claimed:

1. A Bragg grating filter optical waveguide including a first guiding region doped with a material whose refractive index can be modified and a second region around said first region, wherein said Bragg grating is formed in said first region as a quasi-periodic succession of variations of the optical refractive index along the length of said fiber, said grating is inclined relative to a plane perpendicular to the axis of propagation of light in said waveguide; said Bragg grating further includes a variation of said period along the length of said waveguide; said variation of said period is a monotonous variation along the length of said fiber; all or part of said second region is doped with a material having a refractive index that can be modified and said second region is also modified to form a quasi-periodic and inclined longitudinal grating made up of index modifications with the same period and with the same monotonous variation of said period along the length of said waveguide; and wherein said optical waveguide is an optical fiber, said first region is the core of said optical fiber and second region is the cladding of said optical fiber; and wherein an internal part of said fiber has a photosensitivity less than the photosensitivity of a part external to the internal part.

2. The Bragg grating filter optical waveguide claimed in claim 1 wherein said variation of said period along the length of said guide is linear.

3. The Bragg grating filter optical waveguide claimed in claim 1 wherein said grating has a length from two millimeters to two centimeters.

4. The Bragg grating filter optical waveguide claimed in claim 1 wherein the material of said cladding is doped with a refractive index correcting material.

5. The Bragg grating filter optical waveguide claimed in claim 4 wherein said correcting material is fluorine.

6. The Bragg grating filter optical waveguide claimed in claim 4 wherein said correcting material is boron.

7. The Bragg grating filter optical waveguide claimed in claim 1 wherein the material of said core is doped with a refractive index correcting material.

8. The Bragg grating filter optical waveguide claimed in claim 7 wherein said correcting material is phosphorus.

9. The Bragg grating filter optical waveguide claimed in claim 7 wherein said correcting material is aluminum.

10. The Bragg grating filter optical waveguide claimed in claim 1 wherein said internal and external parts are respectively placed in said core and in said cladding of said fiber.

11. The Bragg grating filter optical waveguide claimed in claim 1 wherein said internal and external parts are placed in said core of said fiber.

12. The Bragg grating filter optical waveguide claimed in claim 1, wherein said grating has a length that is at least two millimeters.

13. The Bragg grating filter optical waveguide claimed in claim 1, wherein said grating has a length that is at least two centimeters.

* * * * *